US006837669B2

United States Patent
Reed et al.

(10) Patent No.: US 6,837,669 B2
(45) Date of Patent: Jan. 4, 2005

(54) WIDTH-ADJUSTABLE VEHICLE LOADING RAMP

(75) Inventors: Gary L. Reed, Bonner Springs, KS (US); Ernest Chavana, Joplin, MO (US)

(73) Assignee: Out O'Site, LLC, Springfield, MO (US)

(*) Notice: Subject to any disclaimer, the term of this patent is extended or adjusted under 35 U.S.C. 154(b) by 40 days.

(21) Appl. No.: 10/263,498

(22) Filed: Oct. 2, 2002

(65) Prior Publication Data

US 2003/0072641 A1 Apr. 17, 2003

Related U.S. Application Data

(60) Provisional application No. 60/328,651, filed on Oct. 12, 2001.

(51) Int. Cl.[7] .................................................. B65F 1/00
(52) U.S. Cl. ........................................ 414/537; 14/69.5
(58) Field of Search ....................... 414/537; 14/69.5, 14/71.5, 71.1, 2.4

(56) References Cited

U.S. PATENT DOCUMENTS

| 3,913,934 | A | * | 10/1975 | Koehn et al. ............... 414/537 |
| 5,325,558 | A | * | 7/1994 | Labreche ..................... 14/69.5 |
| 5,598,595 | A | * | 2/1997 | Flinchum ..................... 414/537 |
| 6,164,897 | A | * | 12/2000 | Edwards ...................... 414/537 |
| 6,543,985 | B1 | * | 4/2003 | Harstad et al. .............. 414/537 |

* cited by examiner

Primary Examiner—James R. Bidwell
(74) Attorney, Agent, or Firm—Dennis J M Donahue, III; Grant D. Kang; Husch & Eppenberger LLC

(57) ABSTRACT

A vehicle loading ramp (10) broadly comprises a first load-bearing platform (16), a second load-bearing platform (20) preferably substantially identical to the first platform (16), and a brace (20) that can be positioned between the platforms (16,18) in order to adjust and rigidly fix a distance between the platforms. In each of several embodiments, the brace (20) may be configured to adjust the distance between the platforms (16,18) in order to accommodate different offsets between wheels of different wheeled vehicles. The brace (20) can also fix the distance between the platforms (16,18), thereby providing rigidity and preventing the platforms (16,18) from moving with respect to one another, either laterally or longitudinally.

20 Claims, 9 Drawing Sheets

WIDTH-ADJUSTABLE VEHICLE LOADING RAMP

RELATED APPLICATIONS

This application claims priority of a provisional patent application titled "WIDTH-ADJUSTABLE VEHICLE LOADING RAMP", Ser. No. 60/328,651, filed Oct. 12, 2001, hereby incorporated into the present application by reference.

BACKGROUND OF THE INVENTION

1. Field of the Invention

The present invention relates to loading ramps. More particularly, the present invention relates to a vehicle loading ramp which may be adjusted to safely load a variety of wheeled vehicles onto a carrying vehicle and remain rigid while in use.

2. Description of Prior Art

Vehicle loading ramps are widely used to load wheeled vehicles onto carrying vehicles. For example, people commonly use vehicle loading ramps to load all-terrain vehicles onto pick-up trucks.

There are two general types of vehicle loading ramps currently available. A first type generally comprises two independent load-bearing platforms. The platforms may be arranged with virtually any distance between the platforms in order to accommodate different wheeled vehicles. However, these ramps are unsafe, since they provide no means for locking the platforms together. As such, one of the platforms may slide laterally away from the other causing the wheeled vehicle to fall between the platforms. Additionally, one of the platforms may slide longitudinally with respect to the other and fall off the carrying vehicle, causing the wheeled vehicle to fall. In either case, the wheeled vehicle or the carry vehicle may be damaged. Furthermore, anyone near the wheeled vehicle may be injured.

A second type generally comprises either a single wide load-bearing platform or multiple load-bearing platforms rigidly connected. While these vehicle loading ramps are safer, they are heavy, unwieldy, and cannot be configured for storage in a narrow space. Additionally, these vehicle loading ramps cannot be adjusted. Furthermore, these vehicle loading ramps cannot be shipped to consumers, except by truck freight, which is complicated and costly.

Accordingly, there is a need for an improved loading ramp that overcomes the limitations of the prior art.

SUMMARY OF THE INVENTION

The present invention overcomes the above-identified problems and provides a distinct advance in the art of loading ramps. More particularly, the present invention provides a vehicle loading ramp may be adjusted in width to safely load a variety of wheeled vehicles onto a carrying vehicle and remain rigid while in use. The ramp broadly comprises a first load-bearing platform, a second load-bearing platform preferably substantially identical to the first platform, and a brace that can be positioned between the platforms in order to adjust and rigidly fix a distance between the platforms. The platforms preferably comprise an outside rail, an inside rail, and a plurality of cross-supports between the rails. The platforms may also include a center rail.

In each embodiment, the brace may be configured to adjust the distance between the platforms in order to accommodate different offsets between wheels of different wheeled vehicles. As will be discussed, the brace can also fix the distance between the platforms, thereby providing rigidity and preventing the platforms from moving with respect to one another, either laterally or longitudinally.

For example, a first embodiment of the brace preferably includes at least one sleeve preferably pivotally secured to the inside rail of the first platform and at least one expansion support preferably pivotally secured to the inside rail of the second platform. The expansion support may slide within the sleeve in order to adjust the distance between the platforms. Additionally, both the sleeve and the expansion support preferably include holes that, when aligned, allow the user to insert a locking pin therethrough in order to fix the distance between the platforms. In this manner, the user may fix the distance between the platforms at one of a plurality of distances, such that the ramp can be between approximately thirty-eight inches wide and approximately sixty inches wide. Furthermore, when not in use, the ramp may be folded in on itself, such that the ramp is only slightly wider than the platforms. While only one sleeve and one expansion support is required, the brace preferably incorporates two sleeves and two expansion supports in order to add additional rigidity and stability. Additionally, the brace may include three or more sleeves and expansion supports.

A second embodiment of the brace preferably includes a plurality of tubular receivers and a plurality of fixed length substantially U-shaped bars that rigidly connect opposing pairs of the receivers. The user may choose which of the receivers to join with each bar, thereby adjusting the distance between the platforms. For example, the user may place a first bar between a first receiver on the first platform and a first receiver on the second platform. Similarly, the user may place a second bar between a second receiver on the first platform and a second receiver on the second platform. In this manner, the distance between the platforms may be fixed, such as at twenty-eight inches with the ramp approximately sixty inches wide. With the bars at an angle with respect to one another, the brace rigidly fixes the distance between the platforms.

Alternatively, the user may place the first bar between the first receiver on the first platform and the second receiver on the second platform. Similarly, the user may place the second bar between the second receiver on the first platform and the first receiver on the second platform, essentially crossing the first bar and the second bar. In this manner, the distance between the platforms may be fixed, such as at ten inches with the ramp approximately forty-two inches wide. With the bars crossed in this manner, the brace rigidly fixes the distance between the platforms.

A third embodiment of the brace preferably includes a plurality of tubular receivers substantially identical to those described above and a frame that can be mated to the receivers in two or more orientations. The frame is preferably constructed of four bars similar to those described above welded together to form a rectangular structure having an approximately thirty inch length and an approximately twenty inch width. The receivers are preferably spaced such that the frame may be mated with the receivers along the length or the width of the frame. With the frame mated to the receivers along its length, the platforms are spaced approximately the width of the frame. With the frame mated to the receivers along its width, the platforms are spaced approximately the length of the frame. In this manner, the brace allows the distance between the platforms and the width of the ramp to be adjusted. Additionally, the frame rigidly fixes the distance between the platforms.

A forth embodiment of the brace is preferably used with the platforms that include the center rail and includes two or more hook brackets. Each hook bracket preferably includes a substantially horizontal portion and four or more substantially vertical hooks. Two of the hooks are preferably welded to opposing ends of the horizontal portion while the remaining two hooks are preferably welded to the horizontal portion approximately five inches from the opposing ends. The hooks are preferably long enough so that they may engage the cross-supports of the platforms from below the platforms so as not to interfere as the wheeled vehicle rolls up the ramp 10.

The hooks are preferably spaced such that they may engage the cross-supports between the outside rail and the center rail or between the inside rail and the center rail of each platform. Additionally, the hooks may engage the cross-supports straddling the center rail. Furthermore, the hooks may engage the cross-supports of the first platform and the second platform in different manners. For example, the hooks near a first end of the horizontal portion may engage the cross-supports of the first platform between the outside rail and the center rail of the first platform. The hooks near a second end of the horizontal portion may engage the cross-supports of the second platform between the inside rail and the center rail of the second platform. In this manner, the brace allows the distance between the platforms and the width of the ramp to be adjusted. Two of the hook brackets are preferably used, one near each end of the platforms, in order to rigidly fix the distance between the platforms.

It can be seen that, in any of the above embodiments, the ramp of the present invention provides a safe, sturdy, and rigid vehicle loading ramp that can accommodate different wheeled vehicles. Additionally, the ramp of the present invention can be stored in a narrow space, such as between the wheels of the wheeled vehicle. Furthermore, the ramp of the present invention can be configured for shipment to consumers by common carrier, such as United Parcel Service, simplifying and reducing costs associated with supplying consumers.

BRIEF DESCRIPTION OF THE DRAWINGS

A preferred embodiment of the present invention is described in detail below with reference to the attached drawing figures, wherein.

DETAILED DESCRIPTION OF PREFERRED EMBODIMENTS

Figure 1:
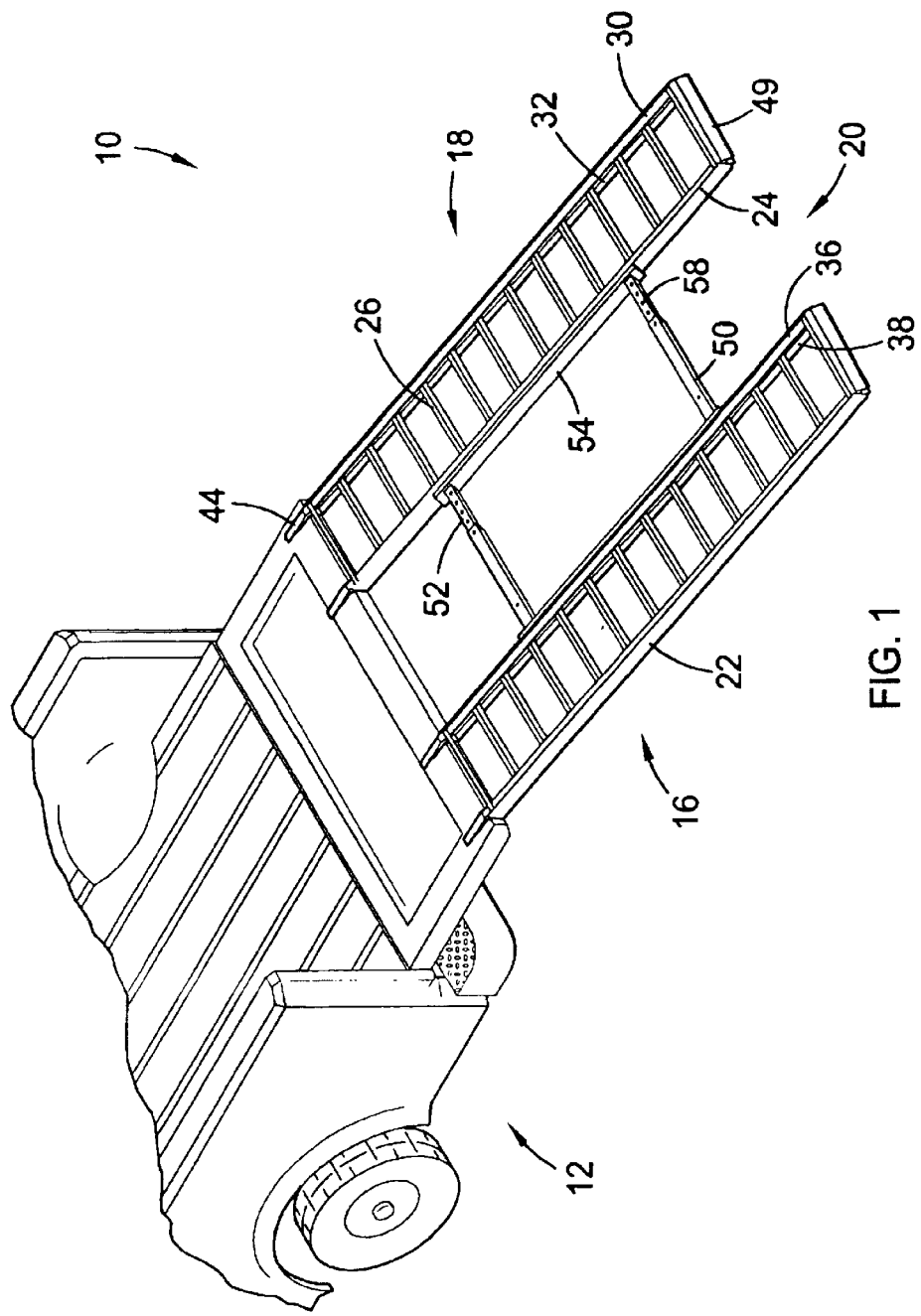
FIG. 1 is a perspective view of a vehicle loading ramp constructed in accordance with the present invention and shown engaging a carrying vehicle.
Figure 2:
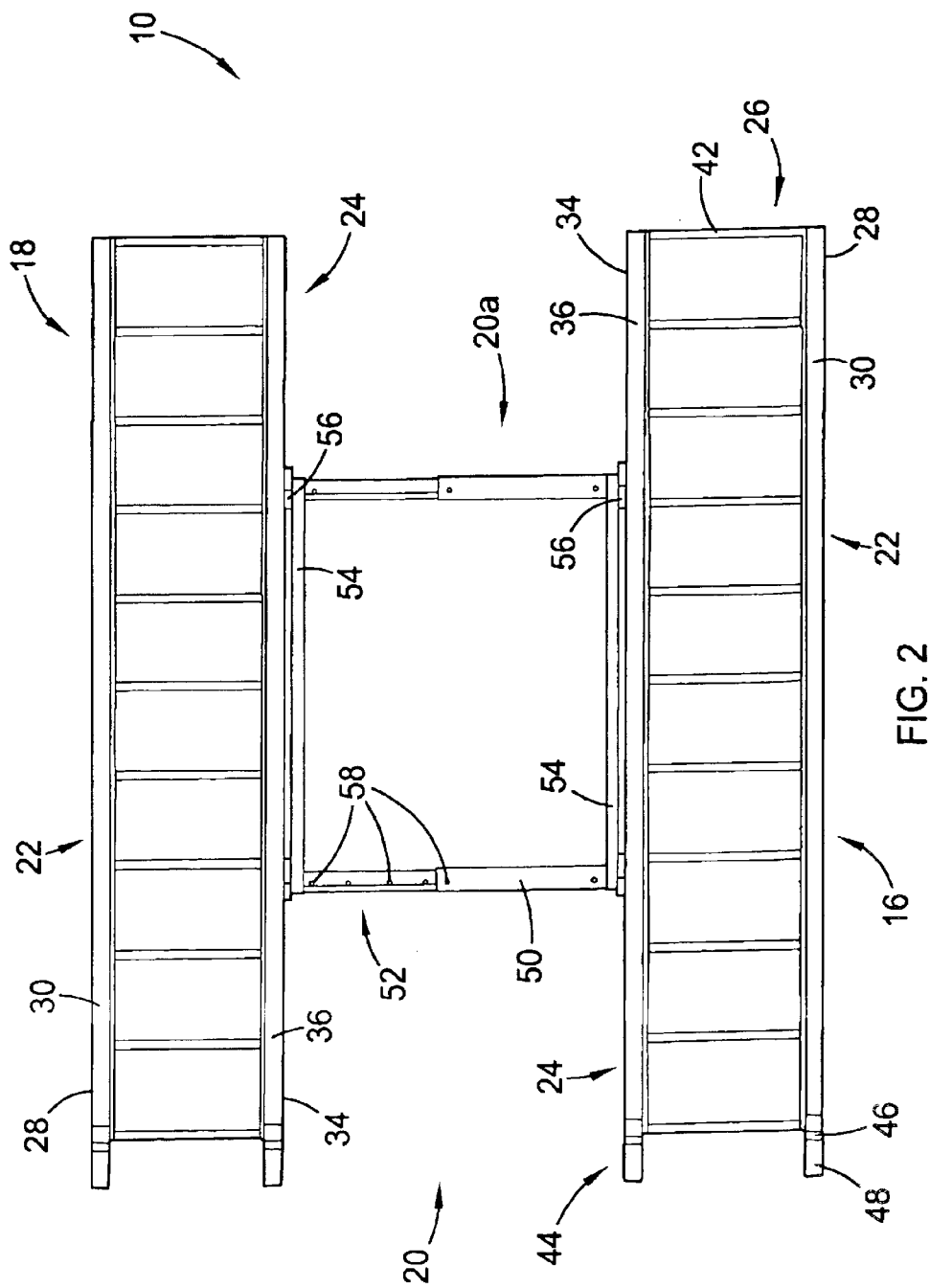
FIG. 2 is a plan view of the ramp showing a first embodiment of a brace substantially fully extended.
Figure 3:
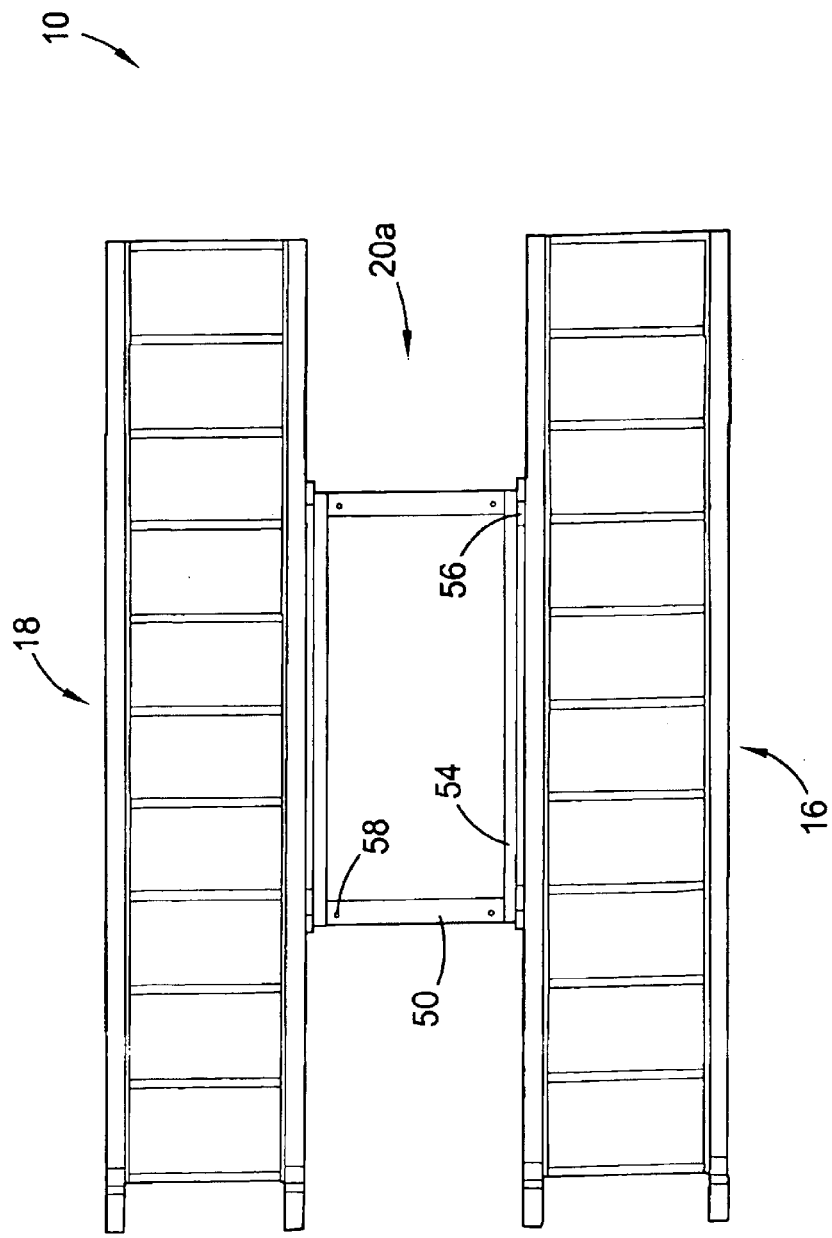
FIG. 3 is a plan view of the ramp showing the first embodiment of the brace substantially fully retracted.

Referring to FIGS. 1-3, the preferred vehicle loading ramp 10 in accordance with the present invention is illustrated positioned between a carrying vehicle 12 and a loading surface such as a driveway, a street, or a loading dock. The ramp 10 broadly comprises a first load-bearing platform 16, a second load-bearing platform 18 preferably substantially identical to the first platform 16, and a brace 20 that can be positioned between the platforms 16,18 in order to adjust and rigidly fix a distance between the platforms 16,18 and provide rigidity to the ramp 10. The ramp 10 assists a user in loading a wheeled vehicle onto the carrying vehicle 12 from the loading surface. The wheeled vehicle preferably has at least two wheels aligned side-by-side with some offset between the wheels. Different wheeled vehicles may have different offsets. The brace 20 may be any one of several embodiments each allowing the user to adjust the distance between the platforms 16,18 in order to accommodate the different offsets between the wheels of the different wheeled vehicles.

The first platform 16 preferably comprises an outside rail 22, an inside rail 24, and a plurality of cross-supports 26 between the rails 22,24. The outside rail 22 is preferably a channel structure presenting an outside surface 28, a top surface 30, and a bottom surface 32. Alternatively, the outside rail 22 may be a box structure, an I-beam structure, or any other commonly used support structure. The outside rail 22 is preferably approximately one quarter inch thick, approximately three inches tall, approximately one inch wide, and approximately seventy-six inches long. The inside rail 24 is preferably substantially identical to the outside rail 22, except that the inside rail 24 is preferably oriented opposite the outside rail 22. Therefore, the inside rail 24 presents an inside surface 34, a top surface 36, and a bottom surface 38.

Each cross-support 26 is preferably a square tube structure presenting an approximately one inch square cross-section with an approximately fifteen and one half inch length. The length of the cross-supports 26 may be between twelve and sixteen inches, or another length, depending upon design choices relating to the first platform's 16 desired width. Each cross-support 26 is preferably secured approximately one inch below the top surface 30,34 of each rail 22,24 and spaced approximately ten inches apart and aligned perpendicular to the rails 22,24. In this manner, the wheels of the wheeled object can roll over the cross-supports 26 and between the rails 22,24. Since the top surface 30,34 of the rails 22,24 are raised, with respect to the cross-supports 26, the wheels of the wheeled vehicle are prevented from riding on the rails 22,24 and/or falling off the first platform 16.

Alternatively, each cross-support 26 may be secured substantially flush with the top surface 30,34 of each rail 22,24. However, this configuration does not inherently prevent the wheels of the wheeled vehicle from riding on the rails 22,24 and/or falling off the first platform 16. Therefore, other provisions, such as raised guide rails and/or knurling the cross-supports 26 and the top surfaces 30,34, are preferably provided in this case.

The second platform 18 is preferably identical to the first platform 16 described above. The platforms 16,18 may be between ten and twenty inches wide and between forty-five and ninety inches long. Additionally, the platforms 16,18 are preferably assembled by welding the cross-supports 26 to the rails 22,24. Alternatively, the cross-supports 26 may be secured to the rails 22,24 using bolts, rivets, or other commonly used assembly techniques. The cross-supports 26 may also be fitted into grooves in the rails 22,24, thereby rigidly securing the cross-supports 26 to the rails 22,24. The platforms 16,18 are preferably constructed from an extruded aluminum alloy that resists rust, but may be constructed of any substantially rigid material that resists rust, such as composites and/or polymers. Alternatively, the platforms 16,18 may be constructed of a rigid material that is susceptible to rust, such as steel. In this case, the platforms 16,18 are preferably painted or otherwise coated in order to protect them from rust.

The platforms 16,18 may include a center rail 40 that reinforces the cross-supports 26, thereby assisting the outside rails 22 and the inside rails 24 in supporting the weight of the wheeled vehicle. The center rail 40 is preferably aligned substantially parallel with and approximately midway between the outside rails 22 and the inside rails 24. The center rail 40 preferably presents a top surface 42 substantially flush with the cross-supports 26. Alternatively, the top surface 42 of the center rail 40 may be slightly raised with respect to the cross-supports 26, but preferably does not extend more than one half inch above the cross-supports 26. The center rail 40 is preferably an I-beam structure, but may be a box structure, a channel structure, or any other commonly used support structure.

The platforms 16,18 may also include one or more fingers 44 that engage the carrying vehicle 12 in order to help secure the ramp 10 to the carry vehicle 12. The fingers 44 are preferably secured to a first end of the rails 22,24,40 and each preferably includes a rail member 46 and an angled member 48. The fingers 44 are preferably approximately one quarter inch thick and preferably constructed of an extruded aluminum alloy, but may be constructed of steel, composites, or polymers. The rail member 46 is preferably approximately as tall and as wide as the outside rail 22 and the inside rail 24.

The angled member 48 is preferably approximately as wide as the rail member 46 and approximately six inches long. The angled member 48 is preferably aligned at an approximately sixty degree angle to the rail member 46 such that the fingers 44 firmly hold the rails 22,24,40 adjacent the carrying vehicle 12 when the ramp 10 is angled downwardly from the carrying vehicle 12. Alternatively, the angled member 48 may be aligned at any angle not greater than ninety degrees to the rail member 46. An angle greater than ninety degrees is likely to cause the ramp 10 slide away from the carry vehicle 12 when the ramp 10 is angled downwardly from the carrying vehicle 12. However, if the ramp 10 is to be angled upwardly from the carrying vehicle 12, then other angles may be used.

The platforms 16,18 may also include a wedge 49 secured to a second end of the rails 22,24,40. The wedge 49 is preferably as long as the width of the platforms and constructed from an extruded aluminum alloy, but may be constructed of steel, composites, or polymers. The wedge 49 is preferably designed to engage the loading surface in order to prevent the ramp 10 from sliding away from the carrying vehicle 12. Therefore, the wedge 49 may have a roughened surface or a rubberized surface allowing it to grip the loading surface.

The ramp 10 may also include straps that hold the platforms 16,18 adjacent the carrying vehicle 12. The straps preferably include an adjustable mechanism, such as a buckle or rachet device, that allows the user to tighten or loosen the straps in order to install or remove them without tools. Once the wheeled vehicle has been loaded onto the carrying vehicle 12, the straps may be used to tie the wheeled vehicle down to the carrying vehicle 12. It is important to note, that the straps preferably have sufficient strength to securely hold the wheeled vehicle. Thus, chains and/or cables may be used in place of the straps and may provide added strength.

In each embodiment, the brace 20 may be configured to adjust the distance between the platforms 16,18. As will be discussed, the brace 20 can also fix the distance between the platforms 16,18, thereby providing rigidity and preventing the platforms 16,18 from moving with respect to one another, either laterally or longitudinally.

For example, a first embodiment of the brace 20a preferably includes at least one sleeve 50 secured to the inside surface 34 of the inside rail 24 of the first platform 16 and at least one expansion support 52 secured to the inside surface 34 of the inside rail 24 of the second platform 18. The sleeve 50 and the expansion support 52 are preferably constructed from an extruded aluminum alloy that resists rust, but may be constructed of any substantially rigid material that resists rust, such as composites and/or polymers. Alternatively, the sleeve 50 and the expansion support 52 may be constructed of a rigid material that is susceptible to rust, such as steel. The sleeve 50 is preferably a square tube structure presenting an approximately two inch square external cross-section, an approximately one and one half inch square internal cross-section, and an approximately fourteen inch length. The sleeve 50 may be secured directly to the first platform 16 or though a bracket 54. Additionally, the sleeve 50 may be secured to the first platform 16 using a hinge 56, thereby allowing the brace 20a to rotate with respect to the first platform 16 so that the ramp 10 may be configured for storage in a narrow space, such as between the wheels of the wheeled vehicle.

Similarly, the expansion support 52 is preferably a square tube structure presenting an approximately one and one half inch square external cross-section and an approximately fourteen inch length. The expansion support 52 may be secured directly to the second platform 18 or though a bracket 54. Additionally, the expansion support 52 may be secured to the second platform 18 using a hinge 56, thereby allowing the brace 20a to rotate with respect to the second platform 18 so that the ramp 10 may be configured for storage in the narrow space.

As discussed above, the external cross-section of the expansion support 52 is preferably similar to the internal cross-section of the sleeve 50, thereby allowing the expansion support 52 to slide within the sleeve 50 in order to adjust the distance between the platforms 16,18. Additionally, both the sleeve 50 and the expansion support 52 preferably include holes 58 that, when aligned, allow the user to insert a locking pin therethrough in order to fix the distance between the platforms 16,18. For example, as shown in FIG. 2, the user may align the holes 58 such that expansion support 52 is nearly completely out of the sleeve 50. The user may then insert the locking pin into the holes 58, thereby securing the platforms 16,18 relatively far apart, such that the ramp 10 is approximately sixty inches wide. Alternatively, as shown in FIG. 3, the user may align the holes 58 such that expansion support 52 is substantially completely within the sleeve 50. The user may then insert the locking pin into the holes 58, thereby securing the platforms 16,18 relatively close together, such that the ramp 10 is approximately forty-eight inches wide. In this manner, the user may fix the distance between the platforms 16,18 at one of a plurality of distances, such that the ramp 10 is between approximately forty-eight inches wide and approximately sixty inches wide. Finally, when not in use, the user may fold the ramp 10 in on itself, such that the ramp 10 is only slightly wider than the platforms 16,18, or approximately between fourteen and seventeen inches wide.

It should be apparent that the sleeve 50 and the expansion support 52 may be longer or shorter. Additionally, the platforms 16,18 may have a different width. For example, the platforms 16,18 may be approximately fifteen inches wide, the sleeve 50 and the expansion support 52 may each be approximately twelve inches long, and the brace 20a may be secured to the platforms 16,18 with approximately one inch thick brackets 54 with integral hinges 56 on each side. In this case, the brace 20a may be adjusted, such that the ramp 10 is between approximately forty-two inches wide and approximately fifty-two inches wide. Additionally, the ramp 10 may be folded in on itself and be only approximately sixteen inches wide. Alternatively, depending upon the length of the sleeve 50 and the expansion support 52 and the width of the platforms 16,18, the user may fix the distance between the platforms 16,18, such that the ramp 10 is between approximately forty-two inches wide and approximately fifty-two inches wide. Furthermore, the ramp 10 may be between approximately forty inches wide and approximately fifty inches wide, or a similar range, again primarily depending upon the length of the sleeve 50 and the expansion support 52 and the width of the platforms 16,18.

When a relatively wide ramp is desired, the sleeve 50 and the expansion support 52 may each be approximately twenty inches long. In this case, the brace 20a may be adjusted, such that the ramp 10 is between approximately fifty-two inches wide and approximately seventy inches wide. Additionally, the ramp 10 may be folded in on itself and be only approximately twenty-two inches wide.

While only one sleeve 50 and one expansion support 52 are required, the brace 20a preferably incorporates two sleeves 50 and two expansion supports 52 in order to add additional rigidity and stability to the ramp 10. Additionally, the brace 20a may include three or more of the sleeves 50 and the expansion supports 52. Respective pairs of the sleeves 50 and the expansion supports 52 are preferably offset approximately forty-eight inches from each other and approximately twenty-four inches from a center point of the length of the ramp 10. The bracket 54 between the sleeve 50 and the first platform 16 and the bracket 54 between the expansion support 52 and the second platform 18 are preferably approximately one quarter inch thick, approximately three inches tall, and approximately fifty inches long. Therefore, the brackets 54 are able to rigidly hold the sleeves 50 and the expansion supports 52, thereby rigidly supporting the platforms 16,18.

While the sleeves 50 and the expansion supports 52 have been described as locking together using the holes 58 and locking pins, other methods may be used. For example, a twist locking mechanism, a friction knob, a clamp, or a spring loaded mechanism may be used to lock the sleeves 50 and the expansion supports 52 together.

Figure 4:
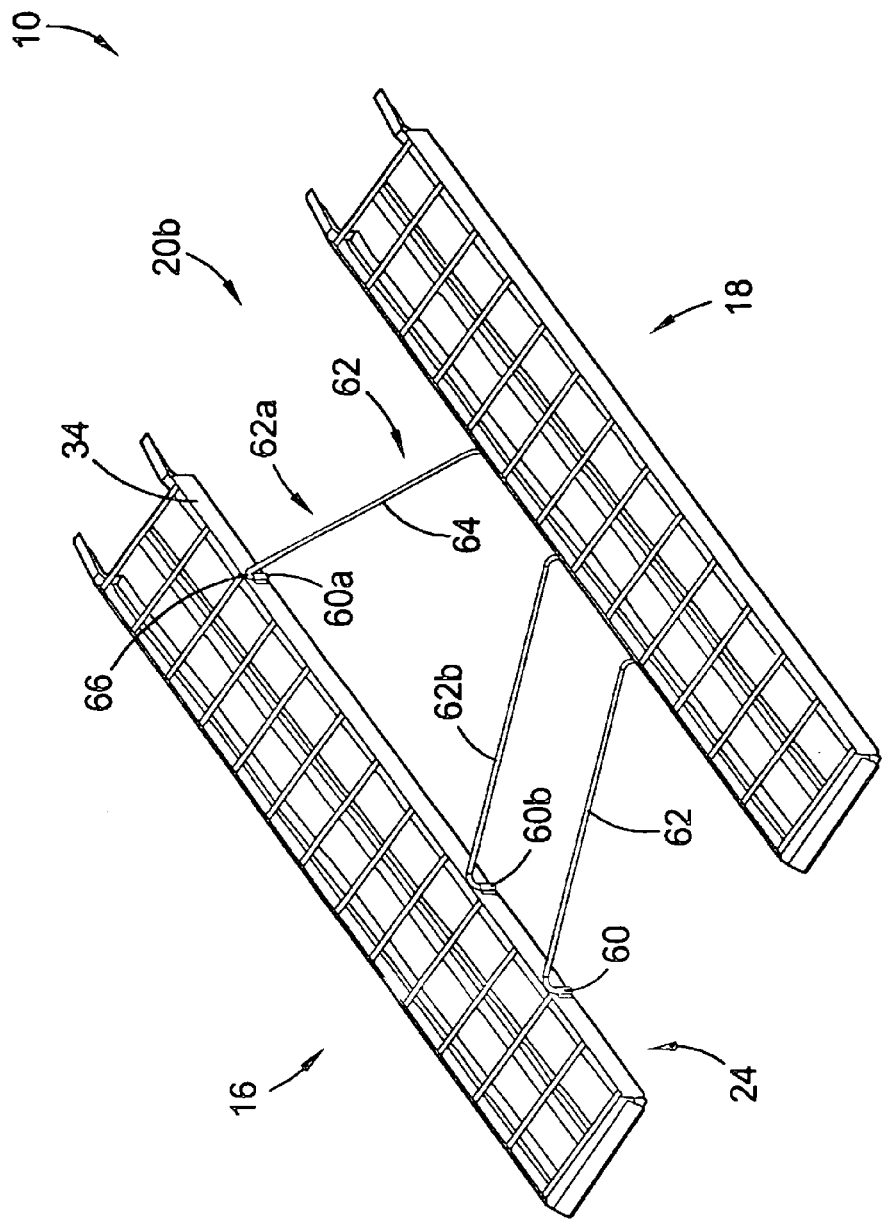
FIG. 4 is a perspective view of the ramp showing a second embodiment of the brace extended.
Figure 5:
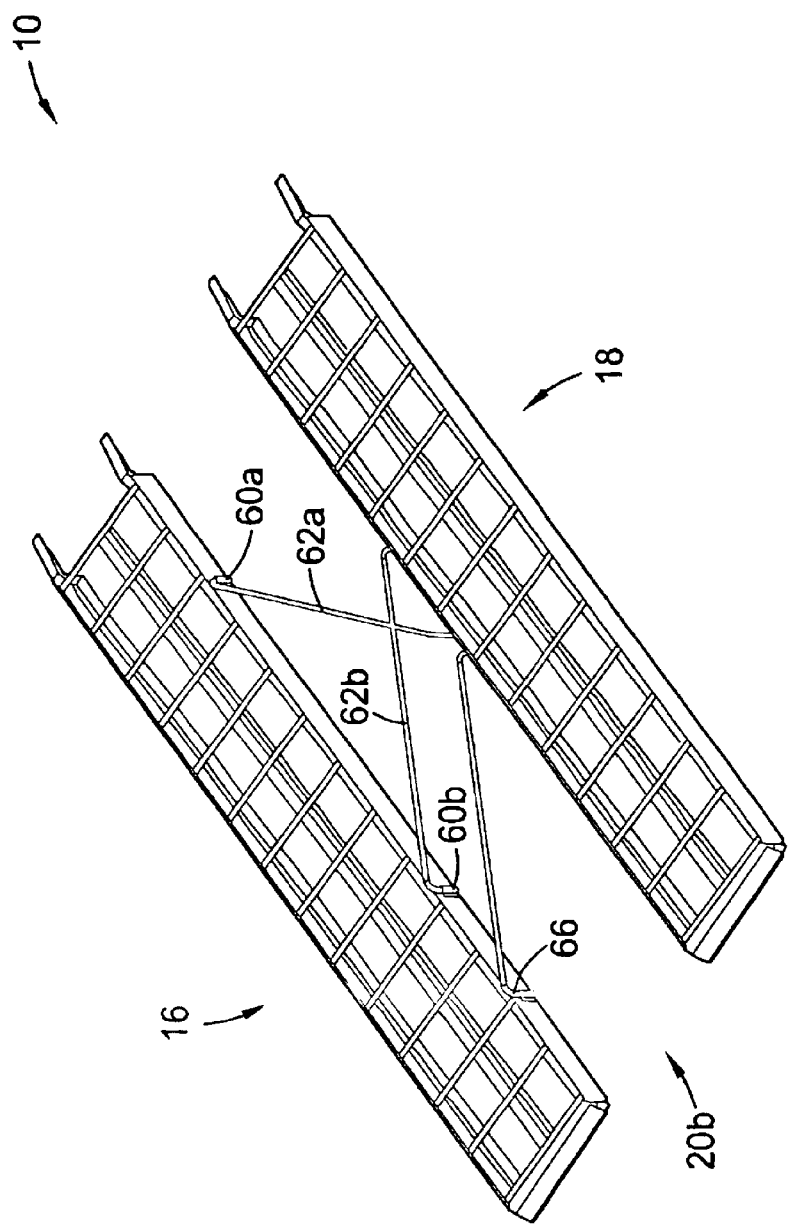
FIG. 5 is a perspective view of the ramp showing the second embodiment of the brace retracted.

Referring now to FIGS. 4 and 5, a second embodiment of the brace 20b preferably includes a plurality of tubular receivers 60 and a plurality of fixed length substantially U-shaped bars 62 that rigidly connect opposing pairs of the receivers 60. The receivers 60 and the bars 62 are preferably constructed from an extruded aluminum alloy that resists rust, but may be constructed of any substantially rigid material that resists rust, such as composites and/or polymers. Alternatively, the receivers 60 and the bars 62 may be constructed of a rigid material that is susceptible to rust, such as steel. The receivers 60 are preferably welded to the inside surfaces 34 of the inside rails 24 of the platforms 16,18. The receivers 60 are preferably approximately three inches tall, preferably have an approximately one half inch internal diameter, and are preferably spaced approximately twenty-four inches apart along the inside surfaces 34 of the platforms 16,18. Although, as will become evident, the receivers 60 may be spaced farther apart or closer together and still accomplish the functionality described below.

The bars 62 preferably include an approximately thirty-six inch substantially horizontal portion 64 and two approximately three inch substantially vertical portions 66 located on opposing ends of the substantially horizontal portion 64. The bars 62 preferably have an approximately one half inch external diameter so that the vertical portions 66 may fit into the receivers 60. One vertical portion 66 of each bar 62 may be inserted into one receiver 60 on each of the platforms 16,18. As shown, the user may choose which of the receivers 60 to join with each bar 62, thereby adjusting the distance between the platforms 16,18.

For example, as shown in FIG. 4, the user may place the vertical portions 66 of a first bar 62a in a first receiver 60a on the first platform 16 and a first receiver 60a on the second platform 18. Similarly, the user may place the vertical portions 66 of a second bar 62b in a second receiver 60b on the first platform 16 and a second receiver 60b on the second platform 18. In this manner, the distance between the platforms 16,18 may be fixed, such as at twenty-eight inches with the ramp 10 approximately sixty inches wide. With the bars 62a,62b at an angle with respect to one another, the brace 20b rigidly fixes the distance between the platforms 16,18. Additionally, a third bar 62c may be added at an angle to the first bar 62a and/or the second bar 62b in order to add further rigidity to the ramp 10.

Alternatively, as shown in FIG. 5, the user may place the vertical portions 66 of the first bar 62a in the first receiver 60a on the first platform 16 and the second receiver 60b on the second platform 18. Similarly, the user may place the vertical portions 66 of the second bar 62b in the second receiver 60b on the first platform 16 and the first receiver 60a on the second platform 18, essentially crossing the first bar 62a and the second bar 62b. In this manner, the distance between the platforms 16,18 may be fixed, such as at ten inches with the ramp 10 approximately forty-two inches wide. With the bars 62a,62b crossed in this manner, the brace 20b rigidly fixes the distance between the platforms 16,18.

It should be apparent that both the spacing of the receivers 60 and the length of the horizontal portion 64 of the bars 62 influence the distance between the platforms 16,18 and to what degree that distance may be adjusted. For example, closely spaced receivers 60 and long bars 62 would result in a maximum adjustability allowing the ramp 10 to be only slightly wider that both platforms 16,18 or as wide as both platforms 16,18 plus the length of the bars 62. Additionally, the ramp 10 may be disassembled and be only approximately as wide as the platforms 16,18.

Figure 6:
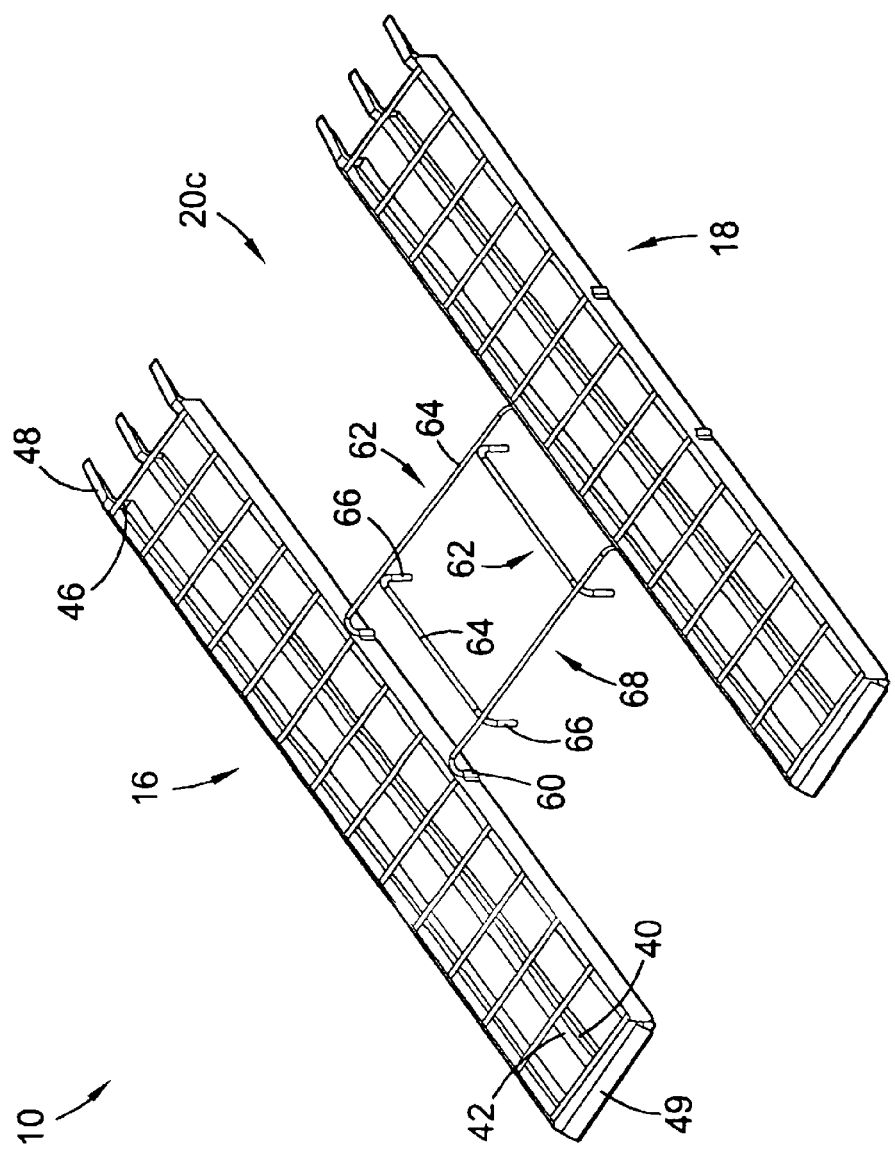
FIG. 6 is a perspective view of the ramp showing a third embodiment of the brace substantially fully extended.
Figure 7:
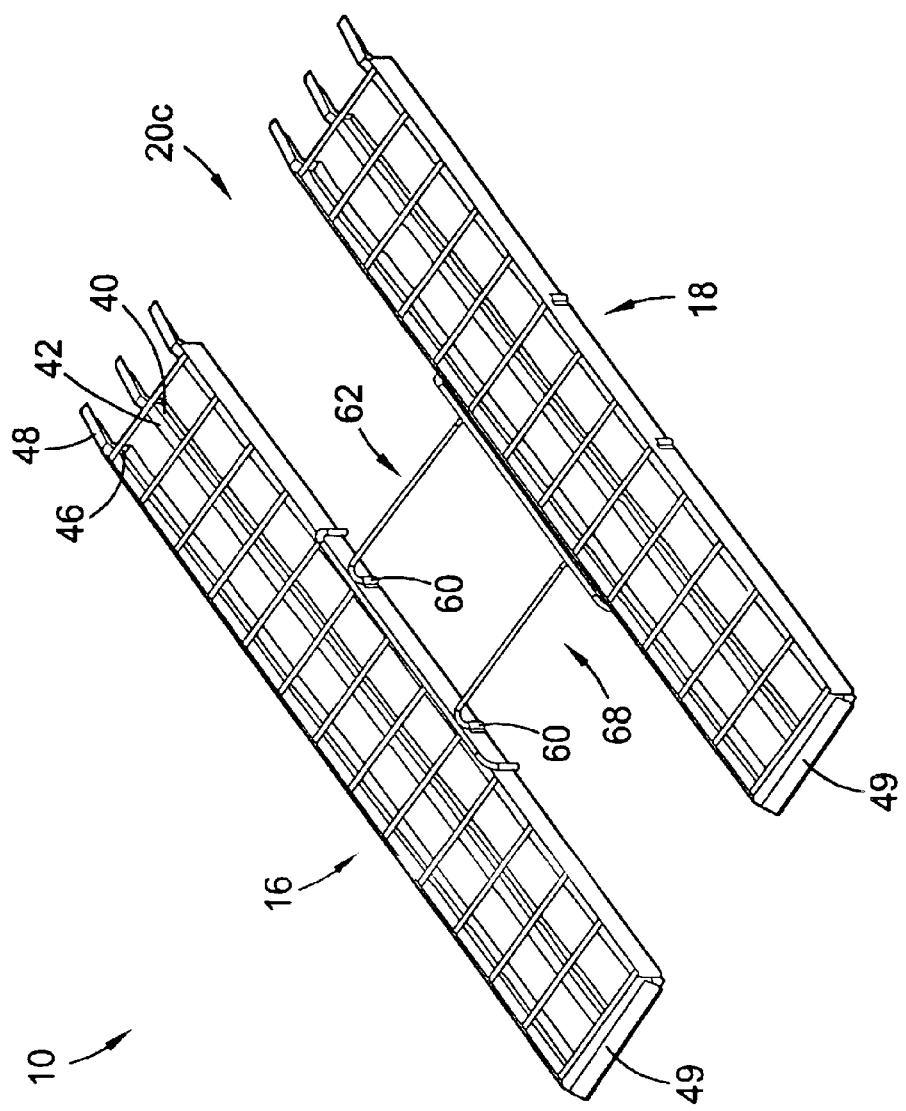
FIG. 7 is a perspective view of the ramp showing the third embodiment of the brace substantially fully retracted.
Figure 8:
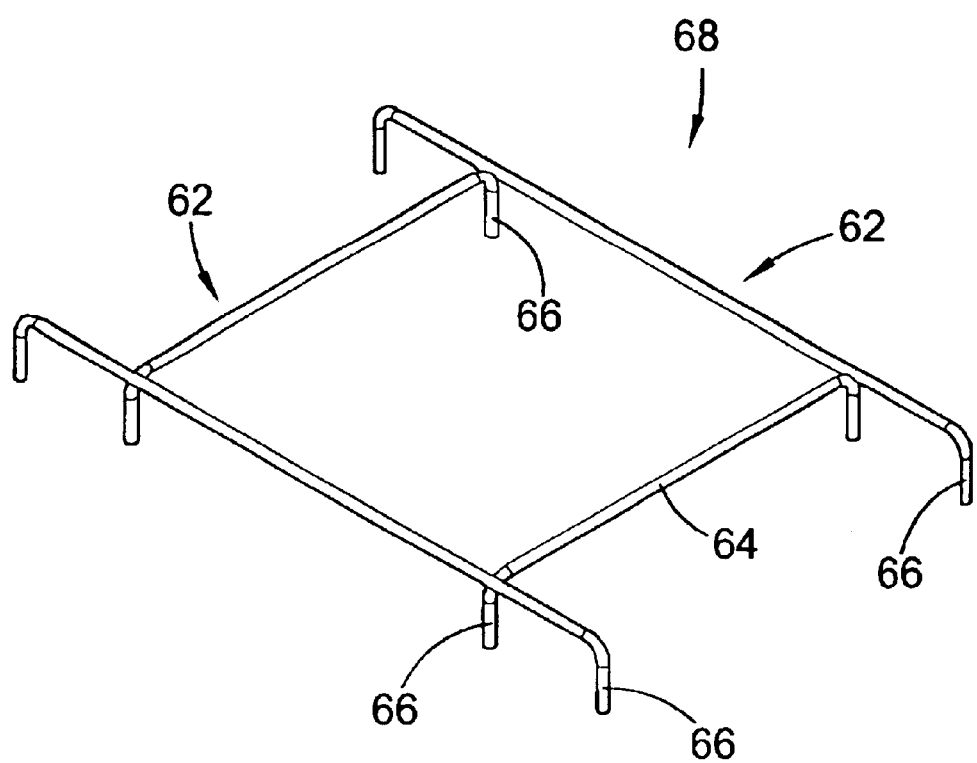
FIG. 8 is a perspective view of a frame of the third embodiment of the brace.

Referring now to FIGS. 6-8, a third embodiment of the brace 20c preferably includes a plurality of tubular receivers 60 substantially identical to those described above and a frame 68 that can be mated to the receivers 60 in two or more orientations. The frame 68 is preferably constructed of four bars 62 similar to those described above, with two of the bars 62 having an approximately twenty inch substantially horizontal portion 64 and two of the bars 62 having an approximately thirty inch substantially horizontal portion 64. The bars 62 of the frame 68 are preferably welded together to form a rectangular structure having an approximately thirty inch length and an approximately twenty inch width.

The receivers 60 are preferably spaced such that the vertical portions 66 of the bars 62 of the frame 68 may be mated with the receivers 60 along the length or the width of the frame 68. As shown in FIG. 6, with the frame 68 mated to the receivers 60 along its length, the platforms 16,18 are spaced approximately twenty inches apart, or roughly the width of the frame 68, giving the ramp 10 an approximately fifty-two inch width. Similarly, as shown in FIG. 7, with the frame 68 mated to the receivers 60 along its width, the platforms 16,18 are spaced approximately thirty inches apart, or roughly the length of the frame 68, giving the ramp 10 an approximately sixty-two inch width. In this manner, the brace 20c allows the distance between the platforms 16,18 and the width of the ramp 10 to be adjusted. In either case, the frame 68 rigidly fixes the distance between the platforms 16,18.

It should be apparent that the length and width of the frame 68 influence the distance between the platforms 16,18 and to what degree that distance may be adjusted. For example, if the frame 68 is approximately forty inches long and approximately ten inches wide, then the ramp 10 may be either approximately seventy-two inches wide or approximately forty-two inches wide, provided the platforms 16,18 are approximately sixteen inches wide. Additionally, the ramp 10 may be disassembled and be only approximately as wide as the frame 68 or the platforms 16,18.

Figure 9:
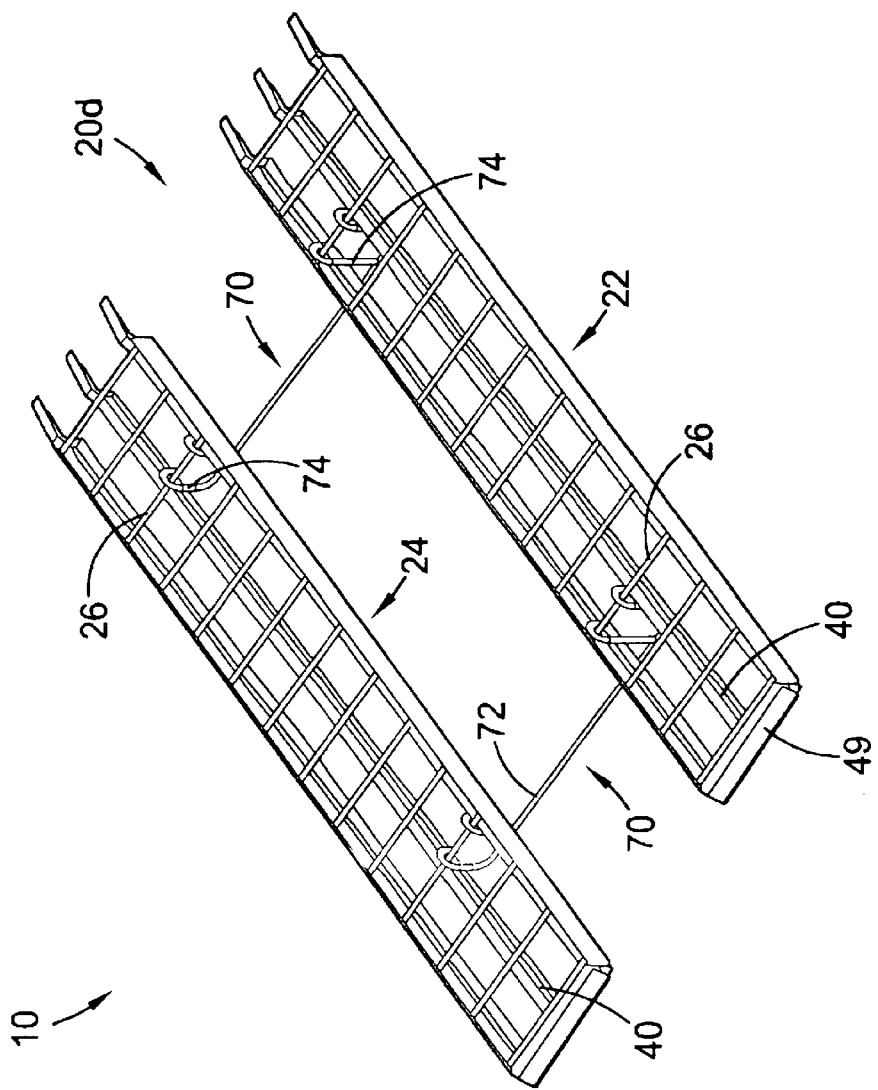
FIG. 9 is a perspective view of the ramp showing a forth embodiment of the brace.

Referring now to FIG. 9, a forth embodiment of the brace 20d is preferably used with the platforms 16,18 when they include the center rail 40 and includes two or more hook brackets 70. The hook brackets 70 are preferably constructed from an extruded aluminum alloy that resists rust, but may be constructed of any substantially rigid material that resists rust, such as composites and/or polymers. Each hook bracket 70 preferably includes an approximately forty inch substantially horizontal portion 72 and four or more substantially vertical hooks 74. Two of the hooks 74 are preferably welded to opposing ends of the horizontal portion 72 while the remaining two hooks 74 are preferably welded to the horizontal portion 72 approximately five inches from the opposing ends. All four of the hooks 74 are preferably aligned such that they share a common orientation with respect to the horizontal portion 72. The hooks 74 are preferably long enough so that they may engage the cross-supports 26 of the platforms 16,18 from below the platforms 16,18 so as not to interfere as the wheeled vehicle rolls up the ramp 10.

The hooks 74 are preferably spaced such that they may engage the cross-supports 26 between the outside rail 22 and the center rail 40 or between the inside rail 24 and the center rail 40 of each platform 16,18. Additionally, the hooks 74 may engage the cross-supports 26 straddling the center rail 40. Furthermore, the hooks 74 may engage the cross-supports 26 of the first platform 16 and the second platform 18 in different manners. For example, the hooks 74 near a first end of the horizontal portion 72 may engage the cross-supports 26 of the first platform 16 between the outside rail 22 and the center rail 40 of the first platform 16. The hooks 74 near a second end of the horizontal portion 72 may engage the cross-supports 26 of the second platform 18 between the inside rail 24 and the center rail 40 of the second platform 18. In this manner, the brace 20d allows the distance between the platforms 16,18 and the width of the ramp 10 to be adjusted. Two of the hook brackets 70 are preferably used, one near each end of the platforms 16,18, in order to rigidly fix the distance between the platforms 16,18.

It should be apparent that the length of the hook brackets 70 influences the distance between the platforms 16,18. For example, if the hook brackets 70 are approximately forty-five inches long, then the ramp 10 may be between approximately sixty-five inches wide or approximately forty-seven inches wide, provided the platforms 16,18 are approximately sixteen inches wide. Additionally, the ramp 10 may be disassembled and be only approximately as wide as the platforms 16,18.

While the present invention has been described above, it is understood that other materials and/or dimensions can be substituted. Additionally, while the present invention has been described for use with wheeled vehicles, such as all-terrain vehicles, tractors, mowers, and dollies, the ramp 10 may also be useful with other vehicles, such as tracked vehicles. These and other minor modifications are within the scope of the present invention. A significant advantage of the present invention is to provide a rigid and safe ramp 10 as wide as or wider than approximately sixty inches while still being able to fold or disassemble to approximately twenty inches or less for easy transportation and storage.

Having thus described a preferred embodiment of the invention, what is claimed as new and desired to be protected by Letters Patent includes the following:

1. A width-adjustable ramp comprising:
   a first load-bearing platform operable to engage a carrying vehicle;
   a second load-bearing platform substantially identical to the first platform; and
   an adjustable brace operable to align the first platform substantially parallel to the second platform with an adjustable distance between the platforms, said adjustable brace comprised of at least one of:
   a sleeve operable to attach to the first platform and an expansion support operable to slide within the sleeve and attach to the second platform;
   a plurality of bars operable to attach to different points along the platforms; and
   a frame with a width and a length different from the width.

2. The ramp as set forth in claim 1, further including fingers operable to detachably mount to the carrying vehicle and extending from an end of each of the platforms.

3. The ramp as set forth in claim 1, wherein each platform includes at least two substantially parallel rails connected by a plurality of cross-supports.

4. The ramp as set forth in claim 3, wherein the brace includes at least one bracket operable to attach to at least one of the cross-supports of each platform.

5. The ramp as set forth in claim 1, wherein the brace includes at least one sleeve operable to attach to the first platform and at least one expansion support operable to slide within the sleeve and attach to the second platform.

6. The ramp as set forth in claim 5, wherein the expansion support is operable to lock into various positions within the sleeve in order to fix the distance between the platforms.

7. The ramp as set forth in claim 1, wherein the brace is hingedly attached to both the first platform and the second platform allowing the ramp to fold in on itself.

8. The ramp as set forth in claim 1, wherein the brace includes a plurality of bars operable to attach to different points along the platforms in order to fix the distance between the platforms.

9. The ramp as set forth in claim 1, wherein the brace includes a frame with a width and a length different from the width, the frame being operable to removably attach to the platforms along the width of the frame in order to fix the distance between the platforms substantially equal to the width.

10. The ramp as set forth in claim 9, wherein the frame may also be attached to the platforms along the length of the frame in order to fix the distance between the platforms substantially equal to the length.

11. The ramp as set forth in claim 1, wherein each platform is between ten and twenty inches wide.

12. The ramp as forth in claim 1, wherein each platform is between forty-five and ninety inches long.

13. The ramp as set forth in claim 1, wherein the adjustable brace is operable to adjust the distance between the platforms such that the ramp is up to sixty inches wide.

14. The ramp as set forth in claim 1, wherein the adjustable brace is operable to adjust the distance between the platforms up to approximately thirty inches.

15. The ramp as set forth in claim 1, wherein the adjustable brace is operable to allow the ramp to be configured for storage such that the entire ramp is no more than slightly wider than either of the platforms.

16. A loading ramp operable to allow a user to adjust its width in order to safely load a variety of wheeled vehicles onto a carrying vehicle, the ramp comprising:
a first load-bearing platform including
an inside rail between forty-five and ninety inches long, between one and three inches wide, and between one and five inches tall,
an outside rail aligned substantially parallel to the inside rail and between seventy and eighty inches long, between one and three inches wide, and between three and five inches tall,
a plurality of cross-supports positioned between and aligned substantially perpendicular to the rails such that the first platform is between ten and twenty inches wide,
a plurality of fingers affixed to one end of the platform for engaging the carrying vehicle, and
a wedge affixed to an opposing end of the platform for engaging a loading surface;
a second load-bearing platform substantially identical to the first platform; and
an adjustable brace operable to align the first platform substantially parallel to the second platform with an adjustable distance between the platforms such that the ramp is up to sixty inches wide, wherein the brace is further operable to be configured for storage in a narrow space no wider than approximately twenty-two inches.

17. A loading ramp operable to allow a user to adjust the width in order to safely load a variety of wheeled vehicles onto a carrying vehicle, the ramp comprising:
a first load-bearing platform;
a second load-bearing platform substantially identical to the first platform; and
an adjustable brace operable to align the first platform substantially parallel to the second platform with an adjustable distance between the platforms, said brace comprised of at least one bracket connected to one of said platforms, said brace rigidly held between said platforms by said bracket.

18. A loading ramp operable to allow a user to adjust its width in order to safely load a variety of wheeled vehicles onto a carrying vehicle and remain rigid while in use, the ramp comprising:
a first load-bearing platform operable to engage the carrying vehicle;
a second load-bearing platform substantially identical to the first platform; and
an adjustable brace operable to align the first platform substantially parallel to the second platform with an adjustable distance between the platforms, the brace including a plurality of receivers secured to the platforms, and
a plurality of bars operable to mate with the different ones of the receivers in order to adjust the distance between the platforms.

19. A loading ramp operable to allow a user to adjust its width in order to safely load a variety of wheeled vehicles onto a carrying vehicle and remain rigid while in use, the ramp comprising:
a first load-bearing platform operable to engage the carrying vehicle;
a second load-bearing platform substantially identical to the first platform; and
an adjustable brace operable to align the first platform substantially parallel to the second platform with an adjustable distance between the platforms, the brace including a plurality of receivers secured to the platforms, and
a frame operable to mate with the receivers in one of two orientations in order to adjust the distance between the platforms.

20. A loading ramp operable to allow a user to adjust its width in order to safely load a variety of wheeled vehicles onto a carrying vehicle and remain rigid while in use, the ramp comprising:
a first load-bearing platform including an inside rail,
an outside rail aligned substantially parallel to the inside rail,
a center rail between and aligned substantially parallel to the inside rail and the outside rail, and
a plurality of cross-supports positioned between and aligned substantially perpendicular to the rails;
a second load-bearing platform substantially identical to the first platform; and
a plurality of hook brackets operable to mate with the cross-members between the rails in any one of a plurality of manners in order to adjust the distance between the platforms.

* * * * *